United States Patent [19]
Johnson

[11] Patent Number: 4,903,220
[45] Date of Patent: Feb. 20, 1990

[54] DUAL PORTED SPEED UP MEMORY IN ROM LOCATION FOR ENGINE ANALYZER

[75] Inventor: James H. Johnson, Lake In The Hills, Ill.

[73] Assignee: Sun Electric Corporation, Crystal Lake, Ill.

[21] Appl. No.: 148,874

[22] Filed: Jan. 27, 1988

[51] Int. Cl.⁴ ...................... G01M 15/00; G06F 15/74
[52] U.S. Cl. .............................. 364/551.01; 73/117.2; 364/424.03
[58] Field of Search .................... 364/421, 431.03, 324, 364/551.01, 424.03, 424.04, 431.01; 73/116, 117.2

[56] References Cited

U.S. PATENT DOCUMENTS

| | | | |
|---|---|---|---|
| 4,027,532 | 6/1977 | Trussell et al. | 364/431.01 |
| 4,234,926 | 11/1980 | Wallace et al. | 364/551.01 |
| 4,291,383 | 9/1981 | Tedeschi et al. | 73/117.2 |
| 4,302,814 | 11/1981 | Full et al. | 364/431.01 |
| 4,418,388 | 11/1983 | Allgon et al. | 364/431.01 |
| 4,530,056 | 7/1985 | MacKinnon et al. | 364/424.02 |
| 4,725,992 | 2/1988 | McNatt et al. | 364/421 |

Primary Examiner—Felix D. Gruber
Attorney, Agent, or Firm—Nicholas A. Camasto

[57] ABSTRACT

An IBM-compatible computer based engine analyzer includes a RAM memory in a ROM cartridge location. A data acquisition system operates substantially independently of the system microprocessor to acquire engine test signals, convert them to digital form and store them via a register in the RAM memory. The system microprocessor has access to the RAM memory via a buffer for reading and changing the data therein. Control logic regulates access to the RAM memory by the A/D converter and the system microprocessor by controlling operation of the register and the buffer.

6 Claims, 4 Drawing Sheets

FIG. 6

| | D15 D14 D13 ... D0 (POSITIVE) | D15 D14 D13 ... D0 (NEGATIVE) |
|---|---|---|
| A | ORIG. DATA | |
| B | DATA WITH D14, D13 SET | |
| C | AND (MASK 1) | |
| D | RESULT (G-B) PARITY ODD | |
| E | XOR (MASK 1) | |
| F | DATA (B-E) | |
| G | AND (MASK 2) | |
| H | RESULT (G-F) PARITY ODD | |
| I | XOR (MASK 2) | |
| J | DATA (H-I) | |

4,903,220

DUAL PORTED SPEED UP MEMORY IN ROM LOCATION FOR ENGINE ANALYZER

CROSS REFERENCE TO RELATED APPLICATIONS

This application is related to co-pending applications Ser. No. 148,973, filed Jan. 27, 1988 entitled Flag Generation System and application Ser. No. 148,972 filed Jan. 27, 1988 entitled Flag Identification System, both of which are hereby incorporated by reference and all of which are assigned to Sun Electric Corporation.

BACKGROUND OF THE INVENTION OF THE PRIOR ART

This invention relates generally to automotive diagnostic test equipment and particularly to computer-based equipment for testing and evaluating internal combustion engines.

The prior art discloses numerous automobile engine diagnostic testing devices that are computer based. One diagnostic tester, identified as the Sun Electric Corporation Model 2001, is described and claimed in U.S. Pat. No. 4,125,894, issued Nov. 14th, 1978, which is incorporated by reference herein. With such a tester, selected analog signals are gathered from the engine under test by one or more suitable probes connected to the engine and the analog signals received therefrom are manipulated, processed and compared with factory specifications for the engine. The data is also displayed on a raster scan cathode ray tube (CRT) display and a print out of test results is also provided.

A recently introduced diagnostic tester that is IBM compatible is the Sun Electric Corporation Model MCA 3000. The MCA 3000 is capable of receiving and processing engine test signals at significantly higher speeds than prior art testers. The high speed of the MCA 3000 is due largely to its data acquisition system (DAS). With the DAS, analog data and test signals obtained from the engine under test are converted by an analog to digital (A/D) converter and stored in an A/D random access memory (RAM), without the intervention of the main system microprocessor or its address/data bus. As fully described and claimed in co-pending application Ser. No. 148,973, flags that identify the beginning of an event, such as a cylinder firing, a cylinder #1 firing, a solenoid dwell cycle and the like are incorporated, where appropriate, in the output of the A/D converter for identifying the data. Sixteen bit digital words are used, eleven bits for signal magnitude, one bit for the sign (polarity) of the magnitude and four bits are made available for use as flags.

In co-pending application Ser. No. 148,972, a parity checking routine is run to identify flags in the digital words in the A/D memory. Bit masking techniques are used to find and to reset the flags when returning the data to memory and information about the location and types of flags is stored in pointer arrays established by the system microprocessor controller.

The present invention utilizes a card slot reserved for a read only memory (ROM) cartridge in an IBM compatible PC system to add a dual ported 128 kilobyte RAM memory. The RAM memory can be written to by the DAS system as well as accessed by the system microprocessor controller. A standard single ported 128 kilobyte RAM is used in conjunction with a pair of buffers to control access to the RAM from the DAS system and the system microprocessor. With the use of the dual ported RAM, the DAS system can operate substantially independently of the system microprocessor in acquiring, converting to digital format and flagging of engine test signals. Thus the system microprocessor and its resources need not be burdened with the task of engine test data acquisition and overall system speed is significantly increased. The dual ported A/D RAM also effectively increases the total system memory available to the microprocessor.

It will be appreciated that the present invention is independent of the inventions in the co-pending applications, although significant additional benefits result from utilization of all of the inventions in a single system. While a system with all inventions will be generally described herein, but those portions that relate to flag generation and identification are more specifically described and claimed in the respective co-pending applications.

OBJECTS OF THE INVENTION

A principal object of the invention is to provide a novel automotive diagnostic tester.

Another object of the invention is to provide a high speed computer-based automotive tester.

A further object of the invention is to provide an improved apparatus for acquiring and retrieving automotive test data.

BRIEF DESCRIPTION OF THE DRAWINGS

These and other objects and advantages of the invention will be apparent upon reading the following description in conjunction with the drawings in which:

FIG. 6 illustrates recovery and resetting of flags.

DESCRIPTION OF THE PREFERRED EMBODIMENT

Figure 1:
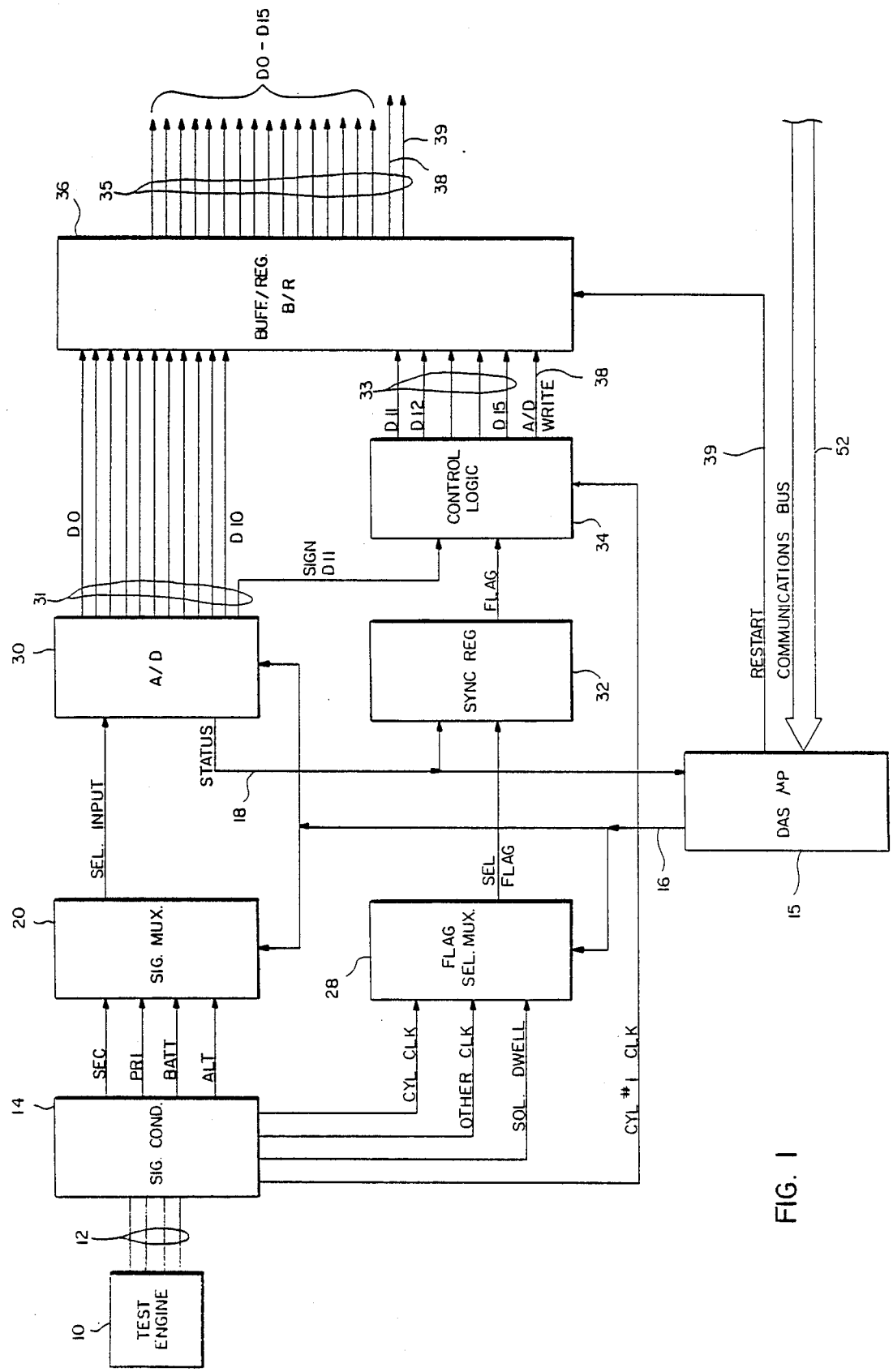
FIG. 1 and FIG. 2 together comprise a block diagram of an automotive diagnostic system utilizing the invention.

In FIG. 1, a test engine is identified by reference numeral 10. A plurality of leads and/or probes 12 is connected to the test engine 10 by the service technician for gathering certain test signals, generally in analog form. The leads 12 are connected to well known signal conditioning apparatus 14, which "cleans up the signals" and develops certain clock signals therefrom. Those indicated are a Cylinder Clock, a Cylinder #1 Clock, an Other Clock, as desired, and a Solenoid Dwell Clock. It will be appreciated that many more signals and data are acquired from the test engine vehicle. Those illustrated are representative only. A plurality of analog signals is supplied from signal conditioner 14 to a signal multiplexer (MUX) 20 that selects which one of the incoming signals is to be supplied, via an output line called selected input, for A/D conversion. This selection is made under control of a DAS microprocessor or controller 15 via a control line 16. The illustrated signals gathered from engine 10 and supplied to MUX 20 are: Primary Ignition; Secondary Ignition; Battery Voltage; and Alternator Current. The clock signals generated by signal conditioner 14 are supplied to a flag selector MUX 28, which is also operated under control of DAS controller 15 via control line 16.

The output of MUX 20 is supplied to an A/D converter 30 which converts the selected analog input signal into 11 bits of data (D0–D10) and a sign bit (D11), all of which are provided on a plurality of output lines 31. The output lines 31 corresponding to bits D0–D10 are connected to a buffer register (B/R) 36 and the output line carrying the sign bit D11 is connected to a control logic block 34. Additionally DAS controller 15 supplies a Restart signal over a line 39 to B/R 36.

Flag select MUX 28 develops a Selected Flag Clock signal at its output. The clock inputs to MUX 28 are a Cylinder Clock, an Other Clock and a Solenoid Dwell Clock. The function of MUX 28 is to provide the Selected Flag Clock signal to a sync register 32. A status line from A/D 30, connected to sync register 32 and to DAS controller 15, apprises controller 15 of when it has completed a conversion. (Controller 15 determines when the requested number of conversions is completed.) The output of sync register 32 is a flag signal that is applied to control logic 34. Other inputs to control logic 34 are the sign bit D11 from A/D 30 and a Cylinder #1 Clock signal from signal conditioner 14. Control logic 34, supplies output signals, corresponding to bits D11–D15 and an A/D write signal on a lead 38, to B/R 36. For data that has no flags, bits D11–D15 are all identical, i.e. either all 0's or all 1's. Thus the combination of leads D0–D10 and D11–D15 provides a sixteen bit input to B/R 36. The output of B/R 36 consists of sixteen leads, carrying bits D0–D15, and two leads carrying the A/D write signal and the Restart signal, respectively. B/R 36 is provided since the signals from A/D 30, control logic 34 and DAS controller 15 are at TTL voltage levels, whereas its signal outputs are carried by a ribbon cable 35 in which the signal voltages are preferably between ±12 volts for improved noise immunity. Ribbon Cable 35 may comprise 18 conductors of a larger group of conductors that is terminated in suitable connectors.

Figure 2:
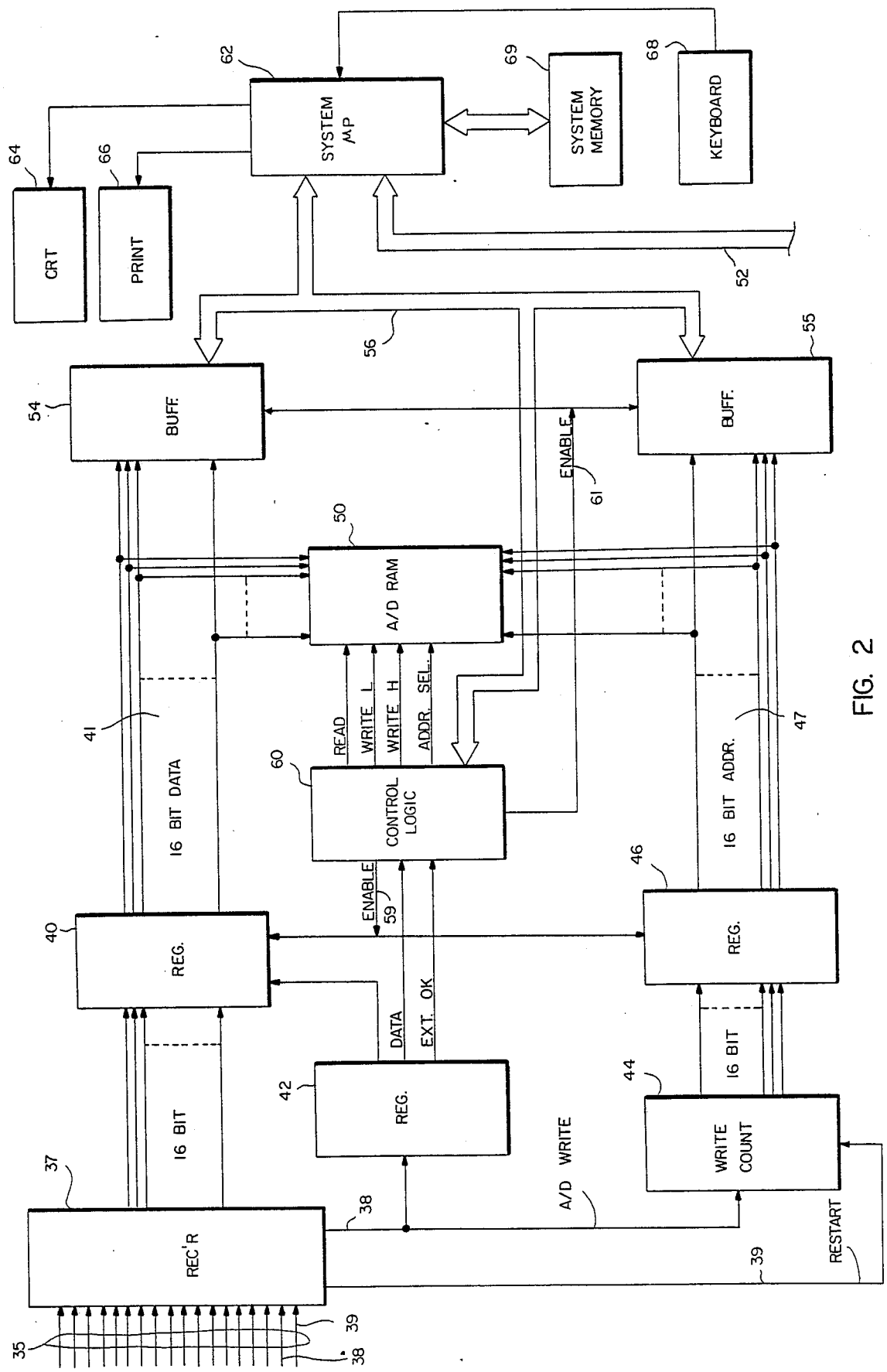

In FIG. 2 the output leads carrying bits D0–D15 and leads 38 and 39 are connected to a receiver 37 where the voltages are transformed back to TTL levels and bits D0–D15 are coupled to a 16 bit register 40. The output of register 40 is carried on a sixteen bit data bus 41 that is connected to an A/D RAM 50 and to a buffer 54. The A/D Write signal on line 38 from receiver 37 is coupled to another register 42 and to a write counter 44. The Restart signal, which acts as a reset, is supplied from receiver 37 to write counter 44. Write counter 44 supplies 16 bits of information to another register 46 which develops the addresses for A/D RAM 50 on a sixteen bit address bus 47. Address bus 47 is connected to another buffer 55 and to A/D RAM 50. Another control logic circuit block 60 receives a Data Available and an External OK signal from register 42 and provides an Enable signal, via a line 59, to registers 40 and 46 and appropriate Read and Write signals and Address Select signals to A/D RAM 50. The buffers 54 and 55 are coupled by a bidirectional communication bus 56 to a system controller 62 and to control logic 60. Operation of buffers 54 and 55 is controlled by another Enable signal from control logic 60 via a line 61. System controller 62 is coupled to DAS controller 15 by another bidirectional communications bus 52. Controller 62 processes data and also controls a cathode ray tube raster scan display 64 and a printer 66. A keyboard 68 enables user interface with microprocessor 62 which is also coupled, via a bidirectional bus to a system memory 69.

For convenience in description, it will be understood that a flag is set by making its bit value opposite to that of the sign bit D15. Conversely a flag is reset or removed by making its bit value equal to that of the sign bit D15. It will also be appreciated that the positions of the flags in the preferred embodiment correspond to the higher order bits, but, in the more general case, a flag may occupy any known bit position in the digital word.

Figure 3:
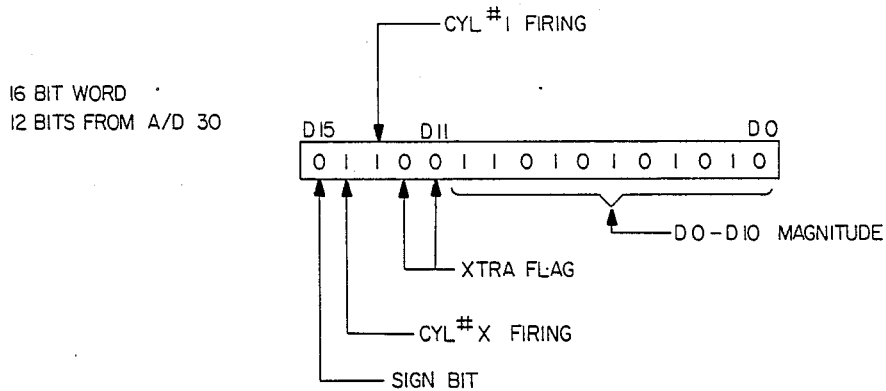
FIG. 3 is a representation of the sixteen bit digital words used in the inventive system.

FIG. 3 illustrates a typical sixteen bit word with bits D0–D10 representing magnitude, bit D15 indicating the sign of the data, flag bits D11 and D12 unset (reset), flag bit D13 set and representing a cylinder #1 firing event (points open) and flag bit D14 set and representing a cylinder #X points open or firing event. It will be appreciated that for other tests, the flags may represent other states, conditions or data. It should also be noted that the system is arranged such that a cylinder #1 flag will not be recognized unless accompanied by a cylinder #X flag. A positive magnitude signal is represented by a sign bit of "0" and a negative magnitude signal is represented by a sign bit of "1". For non-flagged, positive magnitude information, the word in FIG. 3 would have bits D11–D15 all set to "0". Conversely, for negative magnitude non-flagged information bits D11–D15 would all be "1". For a positive magnitude signal with a cylinder #X event, bit D14 is "1" whereas bits D11–D13 and D15 are "0". For a cylinder #1 event, D13 is also "1".

Figure 4:
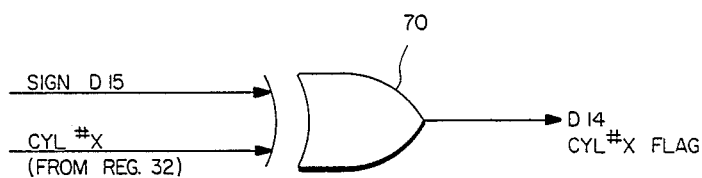
FIG. 4 illustrates circuitry for generating a cylinder firing event flag.

FIG. 4 illustrates how a cylinder #X firing event flag bit (D14) is set to make it opposite to the sign bit. This is accomplished by an exclusive OR gate (XOR) 70 having one input comprising the sign bit D15 and the other input comprising a cylinder #X firing event signal from register 32. The output of XOR 70 represents D14, the cylinder #X flag bit. The characteristics of an XOR are such that its output is high when its input signals differ and is low when its input signals are the same. Thus if the sign bit D15 is "0" (denoting a positive magnitude number) and the cylinder event signal from register 32 is "1" (denoting a cylinder firing event), the output of XOR 70 is "1" and the D14 flag is set, i.e. is made equal to "1" which is opposite of sign bit D15. On the other hand, if there is no cylinder firing event, the output of register 32 is low, as is the sign bit D15, and the output of XOR 70 is also low, indicating that the flag bit D14 is not set.

In operation, the operator or service technician selects the desired test by means of keyboard 68. For the example selected, e.g. secondary voltage waveforms, A/D 30 starts converting on the first Cylinder Clock (points open) condition. Since cylinder #1 is identified and the engine firing order is known, the various cylinder firing events are identified. The analog signals from the test engine are converted into 12 bits of information, (11 bits representing magnitude and one sign bit) by A/D 30. All of the additional four bits may be used for flag selection. These bits are combined with the 12 bits from the A/D 30 to make up the sixteen bit digital words. These words are in turn loaded into A/D RAM 50 under control of address register 46. A/D RAM 50, which has a capacity of 128 kilobytes, may contain about 65,000 conversions of data in sixteen bit words. The information in A/D RAM 50 is a continuous waveform in the sense that no effort is made to compartmentalize the converted data by type as has been necessary in the prior art. With the flag system of the invention, the conversions are put into A/D RAM 50 serially and the flags enable that information to be rapidly retrieved based upon the selected tests.

Figure 5:
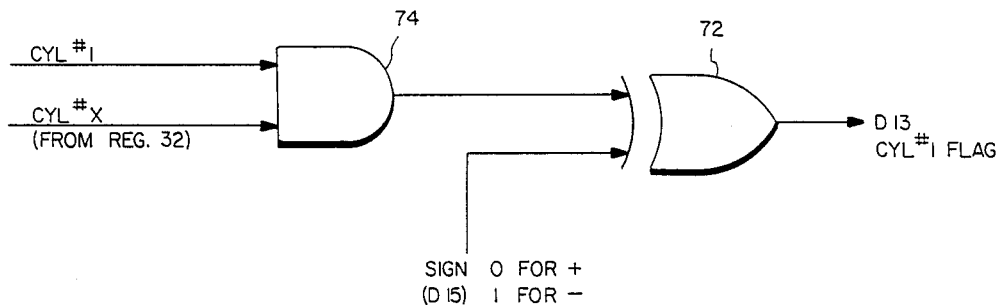
FIG. 5 illustrates circuitry for generating a cylinder #1 firing event flag.

In FIG. 5 the logic arrangement for setting the cylinder #1 flag D13 is shown. An XOR 72 has one input supplied with the sign bit D15 and its other input supplied from the output of an AND gate 74. The inputs to AND 74 are a Cylinder #1 Clock and the cylinder event signal from register 32. AND 74 is provided to assure that the D13 flag is only generated when there is coincidence between a Cylinder #1 Clock signal and a cylinder firing event. Because of the high speed and rapid conversion rate (on the order of 16 microseconds per conversion) of A/D 30, it is possible to have a conversion with a cylinder #1 signal and no cylinder event signal, which is not desirable.

Each conversion is then represented in a sixteen bit address location in A/D RAM 50 with the cylinder firing events and cylinder #1 firing events being flagged by the D13 and D14 data bits. It is a relatively straightforward matter to step through the address locations of the memory to determine whether the D13 and D14 flags have been set and to therefore retrieve that data quite rapidly. Since the system software includes the firing order of the engine under test, when a cylinder #1 event is determined, successive cylinder firing events are immediately known as to the cylinder represented.

In accordance with the invention claimed in copending application Ser. No. 148,972 a parity testing routine is used to very rapidly identify the flags. The parity routine is in software as are the routines for extracting the flags, resetting them by performing AND and XOR operations with appropriate bit masks, and returning the data to memory without flags (i.e. with the flags reset). The software routines thus identify and extract the flags from the digital data stored in A/D RAM 50 and establish pointer arrays identifying the RAM addresses of the flagged words. In the example selected the flags correspond to cylinder #X firings and cylinder #1 firings. The digital data is returned to A/D RAM 50 with the flags reset (removed) so that further processing of the data in A/D RAM 50 can be accomplished rapidly by the system controller 62 since each 16 bit word in RAM 50 represents pure data. Unless the flags are reset, they will affect the magnitude of the stored data and therefore require added system processor time to find and remove them.

In further accordance with Ser. No. 148,972, the data is processed one word at a time by "ANDing" it with a suitable bit mask, i.e. one that leaves only the sign bit D15 and the cylinder #X flag bit D14, and "jumping out" of the loop routine if a "parity ODD" is found (i.e. D15 and D14 are of different value). If a parity ODD is not found, the count of the number of words of A/D memory is decremented by one and the loop is run again until either all words have been tested or another flag is found. If a parity ODD is determined, the address of that word is written into the pointer array established for that flag. An XOR operation, with another bit mask, is performed to clear that flag before returning the word to A/D RAM 50. If more than one flag is being used, (for example a cylinder #X and a cylinder #1 flag) another AND routine with a suitable bit mask is run, followed by a parity EVEN check to determine whether the second flag is present. It will be appreciated that "parity EVEN" is used for code simplification but that parity ODD could also be used. If so, its A/D RAM 50 address is identified in the pointer array established for that flag. The word is again XOR'd with a suitable bit mask to clear the second flag before being written back into A/D RAM 50. The number of flags found is compared to the number of flags needed, as established via the keyboard 68 or the test selected. If more flags are required, the routine is repeated for additional memory locations in A/D RAM 50.

Reference to FIG. 6 will help to clarify the flag identification system. FIG. 6 is divided into two columns, one being for positive magnitude data and another for negative magnitude data. An unflagged data word is shown on line A with bits D15, D14, D13 and D0 identified. On line B, the data word has been altered by setting the D14 and the D13 flags to indicate a cylinder #X firing event and a cylinder #1 firing event, respectively. The first AND bit mask to test for a D14 flag is shown in line C and consists of D15 and D14 being set ("1") and the remainder of the bits being "0". Line D shows the result of ANDing the digital words on lines B and C. At this point the parity test shows a parity ODD condition for both the positive and negative words on line D. That indicates that there is a D14 flag in the word on line B.

The next step is to XOR the data word on line B with a suitable bit mask to reset the D14 flag, as shown on line E where D14 is "1". The result is the data word on line F, which will be seen to correspond to the data word on line B with the D14 flag reset.

To test for a D13 flag, the data word on line F is AND'd with the bit mask on line G consisting of a data word with D15 and D13 being "1" and D14 being "0". Line H shows this result. A parity test is again made, giving a parity ODD result for both the positive and negative data words on line H. It follows that the D13 flag must be reset. To reset the D13 flag, another XOR bit mask is used, as indicated on line I, resulting in a data word on line J that corresponds with the unflagged data word on line A.

Thus, by simply ANDing with bit masks selected for the flags to be identified, running parity tests and XORing with other suitable bit masks, the data word may be returned to AD/RAM 50 with the flags reset, and the location of the flags stored in pointer arrays in system memory. While the example in FIG. 6 is concerned with particular flags, i.e. the cylinder flags, it should be apparent to those skilled in the art that any type of flag can be similarly treated.

As mentioned, the dual ported A/D RAM memory 50 is placed in a location in the computer system that is normally reserved for a ROM cartridge. System microprocessor 62 can read and write to RAM 50 by means of buffers 54 and 55. These buffers are controlled by control logic 60, which also controls registers 40 and 46 that permit writing to RAM 50 by the DAS system, specifically by A/D converter 30. In practice, system microprocessor 62 has priority and the DAS system accesses RAM 50 only when processor 62 does not request it. Thus the control logic is quite straightforward.

The use of the dual ported RAM expands the memory capability of the IBM compatible PC, in a simple, though elegant way. With the system the speed capabilities of the diagnostic tester are enhanced. By utilizing the flag generation and identification inventions of the copending applications, a truly fast acting video display is obtained in conjunction with a very high speed diagnostic system.

It is recognized that numerous changes in the described embodiment of the invention may be made by those skilled in the art without departing from its true spirit and scope. The invention is to be limited only as defined in the claims.

What is claimed is:

1. A diagnostic engine tester comprising:

RAM memory means;

data acquisition means, including a microprocessor and register means coupled to said RAM memory means, for acquiring test signals from an engine for storing them in digital form as data in said RAM memory means;

system microprocessor means, including a memory, for processing data, including said stored engine test signals from said RAM memory means and for accessing said RAM memory means, said data acquisition means and said system microprocessor means operating substantially independently of each other; and control logic means for regulating access to said RAM memory means by said data acquisition means and said system microprocessor means.

2. The tester of claim 1 further including:

buffer means coupled between said system microprocessor means and said RAM memory means; and said control logic means selectively operating said register means and said buffer means to prevent simultaneous access to said RAM memory means by said data acquisition means and said system microprocessor means.

3. The tester of claim 2 wherein said data acquisition means includes an analog to digital converter coupled to said register means, said microprocessor controlling operation of said analog to digital converter; and a communications bus linking said microprocessor and said system microprocessor means.

4. An engine diagnostic tester comprising;

means for receiving and conditioning analog signals received from a test engine;

analog to digital converter means;

means for coupling a selected one of said analog signals from said signal conditioning means to said analog to digital converter means;

a first microprocessor means for controlling operation of said analog to digital converter means;

RAM memory means coupled to said analog to digital converter means for storing digital data therefrom;

a second microprocessor means and a system memory for processing data, including digital data in said RAM memory means;

a communications bus coupling said first microprocessor means and said second microprocessor means; and control logic means for regulating access to said RAM memory means by said analog to digital converter means and by said second microprocessor means.

5. The tester of claim 4, further including; register means interposed between said RAM memory means and said analog to digital converter means, buffer means interposed between said RAM memory means and said second microprocessor means, respectively, and said control logic means selectively enabling said register means and said buffer means.

6. The tester of claim 5 wherein said second microprocessor means is part of a computer system including a read only memory cartridge location and wherein said RAM memory means occupies said read only memory cartridge location.

* * * * *

UNITED STATES PATENT AND TRADEMARK OFFICE
CERTIFICATE OF CORRECTION

PATENT NO. :    4,903,220
DATED       :    February 20, 1990
INVENTOR(S) :   James H. Johnson It is certified that error appears in the above-identified patent and that said Letters Patent is hereby corrected as shown below:

On Front Page of Patent:

[21] Change Appl. No.: "148,874" to --148,974--;

Signed and Sealed this

Eighth Day of January, 1991

Attest:

HARRY F. MANBECK, JR.

*Attesting Officer*     Commissioner of Patents and Trademarks